United States Patent
Yoshida

(10) Patent No.: US 10,723,100 B2
(45) Date of Patent: Jul. 28, 2020

(54) FIBER-REINFORCED RESIN MOLDED ARTICLE AND METHOD FOR MANUFACTURING SAME

(71) Applicants: Nissan Motor Co., Ltd., Yokohama-shi, Kanagawa (JP); Renault s.a.s, Boulogne-Billancourt (FR)

(72) Inventor: Takeshi Yoshida, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 43 days.

(21) Appl. No.: 16/089,424

(22) PCT Filed: May 2, 2016

(86) PCT No.: PCT/JP2016/063531
§ 371 (c)(1),
(2) Date: Sep. 28, 2018

(87) PCT Pub. No.: WO2017/191668
PCT Pub. Date: Nov. 9, 2017

(65) Prior Publication Data
US 2019/0118507 A1 Apr. 25, 2019

(51) Int. Cl.
*B32B 3/30* (2006.01)
*B32B 5/28* (2006.01)
(Continued)

(52) U.S. Cl.
CPC .................. *B32B 5/28* (2013.01); *B32B 3/28* (2013.01); *B32B 3/30* (2013.01); *B32B 5/022* (2013.01); *B32B 5/26* (2013.01); *C08J 5/04* (2013.01); *B32B 2260/021* (2013.01); *B32B 2260/046* (2013.01); *B32B 2305/18* (2013.01);
(Continued)

(58) Field of Classification Search
CPC .. B32B 3/30; B32B 5/28; B32B 5/022; B32B 2305/18; B32B 2305/20; B32B 2260/046; B32B 2260/021; B32B 2313/04; Y10T 428/24521; Y10T 428/24628
See application file for complete search history.

(56) References Cited

U.S. PATENT DOCUMENTS 4,024,211 A * 5/1977 Strauss .............. A61C 13/0003
264/16
2006/0286315 A1* 12/2006 Hashimoto ............ B41J 2/0057
428/32.34

FOREIGN PATENT DOCUMENTS

JP H10-296866 A 11/1998
JP 2986564 B2 12/1999
(Continued)

*Primary Examiner* — Donald J Loney
(74) *Attorney, Agent, or Firm* — Global IP Counselors, LLP

(57) ABSTRACT

A fiber-reinforced resin molding includes a core layer and a pair of skin layers. The core layer includes a nonwoven fabric and impregnating resin that has been impregnated in the nonwoven fabric. The skin layers include fibers and a matrix resin that covers the fibers. The fibers and a matrix resin of the skin layers are joined to both surfaces of the core layer. The skin layers each have recesses that are formed on side surfaces that face the core layer such that a portion of the fibers in the matrix resin are exposed, and where portions of the nonwoven fabric and the impregnating resin have penetrated the recesses.

4 Claims, 4 Drawing Sheets

(51) Int. Cl.
*B32B 5/02* (2006.01)
*B32B 3/28* (2006.01)
*B32B 5/26* (2006.01)
*C08J 5/04* (2006.01)

(52) U.S. Cl.
CPC ....... *B32B 2305/20* (2013.01); *B32B 2307/50* (2013.01); *B32B 2313/04* (2013.01); *B32B 2605/00* (2013.01); *Y10T 428/24521* (2015.01); *Y10T 428/24628* (2015.01)

(56) References Cited

FOREIGN PATENT DOCUMENTS

JP 4615398 B2 10/2010
WO 2014/162873 A1 10/2014

\* cited by examiner

FIBER-REINFORCED RESIN MOLDED ARTICLE AND METHOD FOR MANUFACTURING SAME

CROSS-REFERENCE TO RELATED APPLICATIONS

This application is a U.S. national stage application of International Application No. PCT/JP2016/063531, filed on May 2, 2016.

BACKGROUND

Field of the Invention

The present invention relates to a fiber-reinforced resin molding and a method for producing same.

Background Information

A fiber-reinforced resin molding configured comprising FRP (Fiber Reinforced Plastic), which is a type of composite material, is known from the prior art (refer, for example, to Japanese Patent No. 4615398—Patent Document 1).

Patent Document 1 discloses a carbon fiber composite material molding obtained by sandwiching a core layer of nonwoven fabric between two carbon fiber layers, which form skin layers, to form a stacked body, and impregnating the stacked body with an impregnating resin, followed by curing.

SUMMARY

In the carbon fiber composite material molding described above, the skin layers and the core layer are joined only by resin, and the joining force between the skin layers and the core layer is low; consequently, when a load is applied to the carbon fiber composite material molding, there is the possibility that the skin layers and the core layer between the layers will separate.

Thus, the object of the present invention is to prevent the skin layer from separating from the core layer by increasing the joining force between the skin layer and the core layer.

A first feature of the present invention is a fiber-reinforced resin molding comprising a core layer comprising a nonwoven fabric and impregnating resin that has been impregnated into the nonwoven fabric, and a pair of skin layers comprising fibers and a matrix resin that covers the fibers. The skin layers have recesses that are formed in the core layer side surfaces and in which some of the fibers in the matrix resin are exposed, and portions of the nonwoven fabric and the impregnating resin penetrate the recesses.

A second aspect of the present invention is a method for producing a fiber-reinforced resin molding. The production method includes a step for forming recesses in which some of the fibers in the matrix resin the skin layers are exposed to the core layer side surfaces, and a step for disposing a nonwoven fabric between a pair of the skin layers, causing portions of the nonwoven fabric and the impregnating resin to penetrate the recesses, and joining the skin layers and the core layer in that state.

According to the present invention, it is possible to prevent separation of the skin layers from the core layer by increasing the joining force between the skin layers and the core layer.

DETAILED DESCRIPTION OF THE EMBODIMENTS

An embodiment of the present invention will be described in detail below with reference to the drawings.

A fiber-reinforced resin molding 10 according to an embodiment of the present invention will now be described with reference to FIGS. 1 to 3.

The fiber-reinforced resin molding 10 can be applied, for example, to vehicle component members, such as a hood (bonnet), a bumper, a trunk lid, a rear gate, a fender panel, a side body panel, and a roof panel. In addition, the fiber-reinforced resin molding 10 is not limited to vehicle component members and can be applied to various types of component members.

Figure 1:
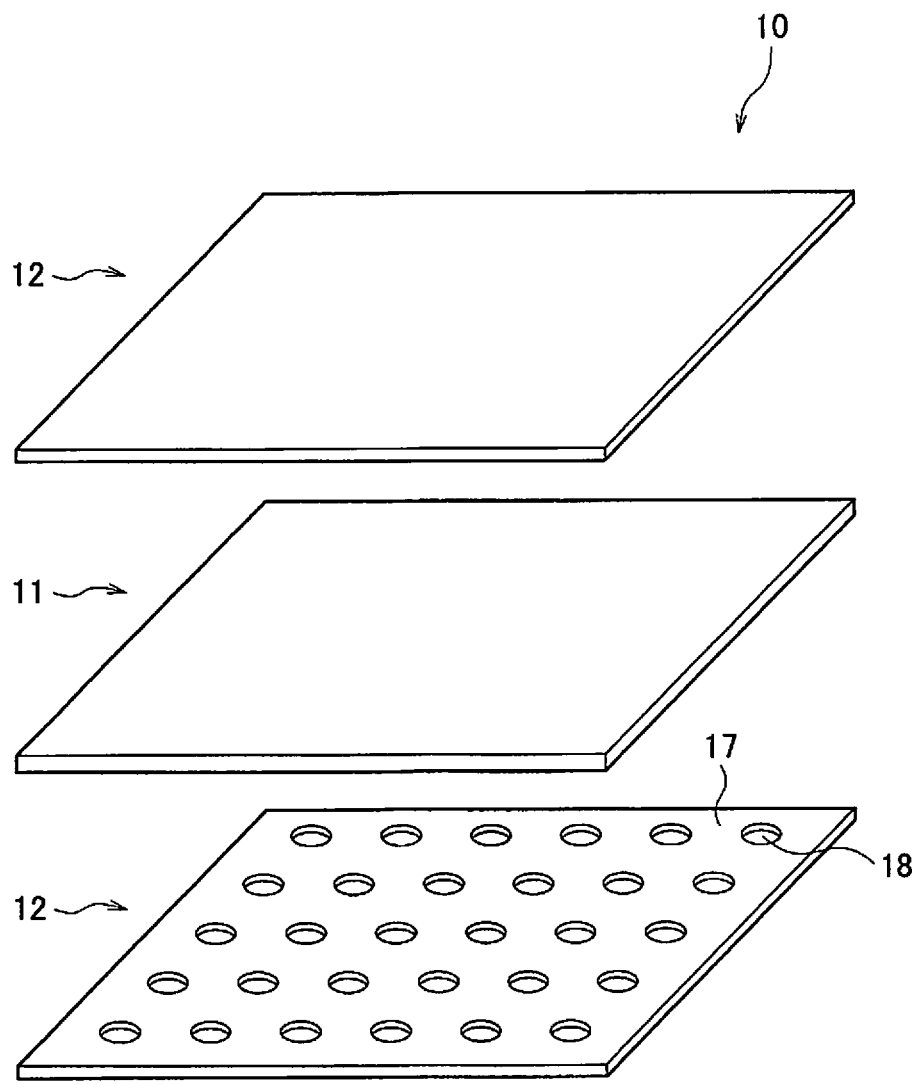
FIG. 1 is an exploded perspective view of a fiber-reinforced resin molding according to an embodiment of the present invention.
Figure 2:
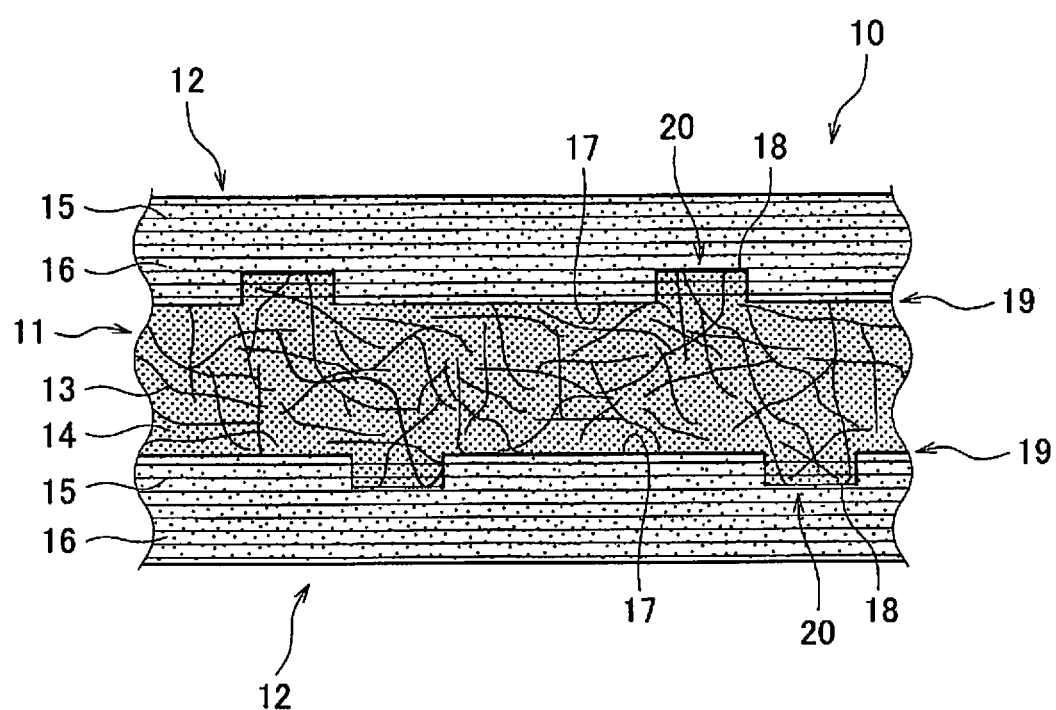
FIG. 2 is a cross-sectional view of the fiber-reinforced resin molding according to the embodiment of the present invention.

The fiber-reinforced resin molding 10 comprises a core layer 11 and a pair of skin layers 12, 12 that are joined to both surfaces of the core layer 11, as illustrated in FIGS. 1 and 2.

The core layer 11 is a nonwoven fabric layer comprising a nonwoven fabric 13 and an impregnating resin 14 that has been impregnated in the nonwoven fabric 13. The thickness of the core layer 11 is, for example, about 0.2 mm-10.0 mm. The nonwoven fabric 13 is formed from known fibers, such as cotton, rayon, nylon, polyester, polypropylene, and aramid fibers. The impregnating resin 14 is formed from a thermosetting resin, such as epoxy resin, unsaturated polyester resin, vinyl ester resin, and phenol resin. In addition, the impregnating resin 14 may be formed from a thermoplastic resin, such as polyamide resin, polyolefin resin, dicyclopentadiene resin, and polyurethane resin.

The skin layers 12 are made up of a fiber layer comprising fibers 15 and a matrix resin 16 that covers the fibers 15. That is, the skin layers 12 are what is referred to as an FRP (fiber-reinforced resin). The thicknesses of the skin layers 12 are, for example, about 0.4 mm to 5.0 mm. The fibers 15 can be formed from various fibers, such as carbon fiber, glass fiber, and aramid fiber (Kevlar fiber). The matrix resin 16 can be formed from thermosetting resin, such as epoxy resin, unsaturated polyester resin, vinyl ester resin, and phenol resin. In addition, the matrix resin 16 can be formed from a thermoplastic resin, such as polyamide resin, polyolefin resin, dicyclopentadiene resin, and polyurethane resin.

The impregnating resin 14 of the core layer 11 and the matrix resin 16 of the skin layers 12 can be of the same or of different types. From the standpoint of enhancing the joining force between the core layer 11 and the skin layers 12, the impregnating resin 14 of the core layer 11 and the matrix resin 16 of the skin layers 12 are preferably resins that have high affinity.

The skin layers 12 have a plurality of recesses 18 formed on side surface 17 facing the core layer 11 such that portions of the fibers 15 in the matrix resin 16 are exposed. The matrix resin 16 of the skin layers 12 and the impregnating resin 14 of the core layer 11 are joined (bonded), in a state in which portions of the nonwoven fabric 13 and the impregnating resin 14 have penetrated the recesses 18. Thus, the fiber-reinforced resin molding 10 is formed in the joint portion 19 between the core layer 11 and the skin layers 12 and includes a plurality of mixed regions 20 in which the nonwoven fabric 13 and the fibers 15 are mixed.

The recesses 18 and the mixed regions 20 are arranged at intervals in the longitudinal direction and the lateral direction on the surfaces of the skin layers 12, as illustrated in FIG. 1. In the figure, the recesses 18 and the mixed regions 20 are arranged at equal intervals, but no limitation is imposed thereby, and the intervals need not be equal.

In addition, the positions of the recesses 18 and the mixed regions 20 in the in-plane direction of the skin layers 12 (direction that is parallel to the surface) are asymmetrical relative to the core layer 11 between one and the other of the pair of skin layers 12, 12, as illustrated in FIG. 2. That is, the recesses 18 and the mixed regions 20 are arranged in different locations between one and the other of the pair of skin layers 12, 12. However, no limitation is imposed thereby; the positions of the recesses 18 and the mixed regions 20 in the in-plane direction of the skin layer 12 can be symmetrical relative to the core layer 11 between one and the other of the pair of skin layers 12, 12.

Next, a method for producing the fiber-reinforced resin molding 10 according to the present embodiment will be described.

1. Application of Wax

Figure 3A:
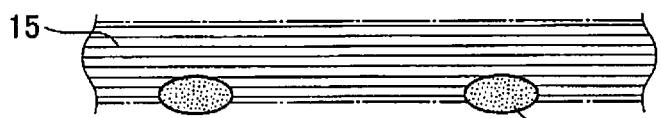
FIG. 3A is an explanatory view of a method for producing the fiber-reinforced resin molding according to the embodiment of the present invention.

First, a wax 21 is applied to a sheet or a bundle of fiber 15, as illustrated in FIG. 3A, in randomly distributed fashion and the applied wax 21 is cured and hardened.

Thermoplastic resins such as polyvinyl alcohol (PVA), polyethylene (PE), or polypropylene (PP), for example, may be used as the wax 21. Polyethylene and polypropylene have relatively low melting points; therefore, when polyethylene or polypropylene is used as the wax 21, it is necessary to set the injection temperature of the matrix resin 16 to be less than or equal to the melting points of polyethylene and polypropylene.

2. Injection of Matrix Resin into the Mold

Figure 3B:
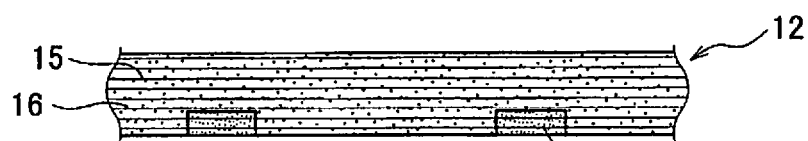
FIG. 3B is an explanatory view of a method for producing the fiber-reinforced resin molding according to the embodiment of the present invention.

Next, the fibers 15 are placed in the mold and the matrix resin 16 is injected into the mold to impregnate the fibers 15 with the matrix resin 16, as illustrated in FIG. 3B. Then, the impregnated matrix resin 16 is cured and hardened to prepare the skin layer 12.

3. Removal of Wax

Figure 3C:
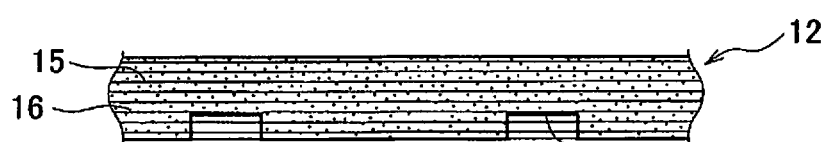
FIG. 3C is an explanatory view of a method for producing the fiber-reinforced resin molding according to the embodiment of the present invention.

Next, the wax 21 is melted with warm water or a solvent to form recesses 18 on the skin layer 12, as illustrated in FIG. 3C.

That is, in the present embodiment, the lost wax method is used to form the recesses 18 on the skin layer 12.

4. Stacking

Figure 3D:
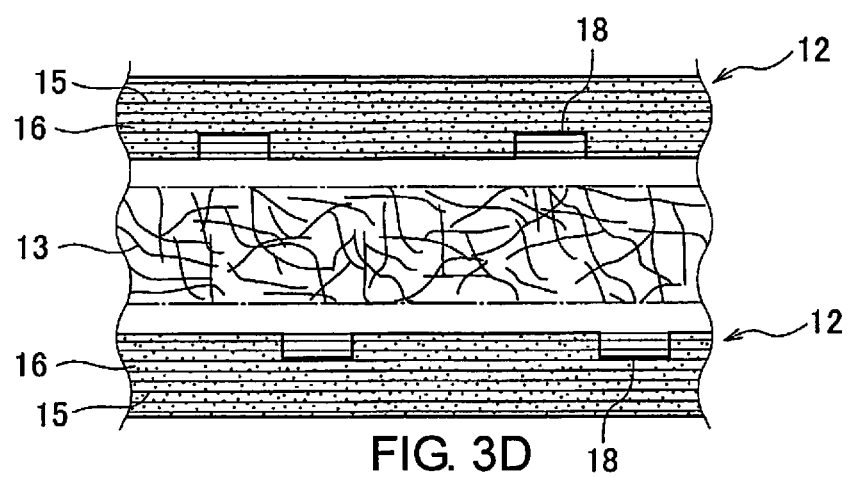
FIG. 3D is an explanatory view of a method for producing the fiber-reinforced resin molding according to the embodiment of the present invention.

Next, the nonwoven fabric 13 is stacked between a pair of skin layers 12, 12 to prepare a stacked body 22, as illustrated in FIG. 3D.

5. Injection of Impregnating Resin into the MOLD

Figure 3E:
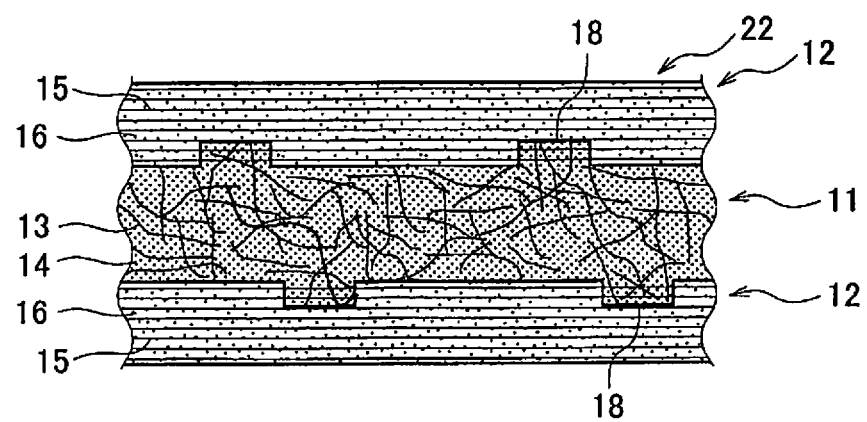
FIG. 3E is an explanatory view of a method for producing the fiber-reinforced resin molding according to the embodiment of the present invention.

Next, the stacked body 22 is placed in a mold, impregnating resin 14 is injected into the mold, and the nonwoven fabric 13 is impregnated with the impregnating resin 14, as illustrated in FIG. 3E. In this step to inject the impregnating resin 14 into a mold, portions of the nonwoven fabric 13 and the impregnating resin 14 are made to penetrate each recess 18, and the fibers 15 that are exposed due to the removal of the wax 21 become entangled with the nonwoven fabric 13. Then, the impregnating resin 14 is cured and hardened to prepare a fiber-reinforced resin molding 10.

That is, in the present embodiment, the RTM molding (Resin Transfer Molding) method is used to mold the stacked body 22.

The action and effects of the present embodiment will be described below.

(1) A fiber-reinforced resin molding 10 according to the present embodiment comprises a core layer 11 comprising a nonwoven fabric 13 and impregnating resin 14 that has been impregnated into the nonwoven fabric 13; and a pair of skin layers 12, 12 comprising fibers 15 and a matrix resin 16 that covers the fibers 15 and that are joined to both surfaces of the core layer (11). The skin layers 12 have recesses 18 that are formed on side surfaces 17 facing the core layer 11 such that a portion of the fibers 15 in the matrix resin 16 are exposed, and portions of the nonwoven fabric 13 and the impregnating resin 14 have penetrated the recesses 18.

In the fiber-reinforced resin molding 10 according to the present embodiment, the matrix resin 16 of the skin layer 12 and the impregnating resin 14 of the core layer 11 are joined in a state in which portions of the nonwoven fabric 13 and the impregnating resin 14 have penetrated the recesses 18. That is, mixed regions 20, in which the nonwoven fabric 13 and the fibers 15 are mixed, are formed in the joint portion 19 between the core layer 11 and the skin layer 12. Thus, it is possible to enhance the joining force between the skin layer 12 and the core layer 11 and to reduce the possibility that the skin layer 12 and the core layer 11 will separate between the layers, even if a load is applied to the fiber-reinforced resin molding 10.

Therefore, according to the fiber-reinforced resin molding 10 of the present embodiment, it is possible to prevent the skin layer 12 from separating from the core layer 11 by increasing the joining force between the skin layer 12 and the core layer 11.

(2) The positions of the recesses 18 in the in-plane direction of the skin layer 12 are asymmetrical relative to the core layer 11 between one and the other of the pair of skin layers 12, 12.

Thus, it is possible to shift the positions of the mixed regions 20, in which the nonwoven fabric 13 and the fibers 15 are mixed, in the in-plane direction of the skin layer 12 between one and the other of the pair of skin layers 12, 12, and to thereby prevent the generation of locations with low densities of the nonwoven fabric 13 in the core layer 11.

(3) The method for producing a fiber-reinforced resin molding 10 according to the present embodiment comprises a step (Step 1) for forming recesses 18 in which portions of the fibers 15 in the matrix resin 16 are exposed on side surfaces 17 of the skin layer 12 facing the core layer 11, and a step (Step 2) for disposing the nonwoven fabric 13 between the pair of skin layers 12, 12, causing some of the nonwoven fabric 13 and impregnating resin 14 to penetrate the recesses 18, and joining the skin layer 12 and the core layer 11 in that state.

As a result, the matrix resin 16 of the skin layer 12 and the impregnating resin 14 of the core layer 11 are joined in a state in which some of the nonwoven fabric 13 and the impregnating resin 14 have penetrated the recesses 18. That is, mixed regions 20, in which the nonwoven fabric 13 and the fibers 15 are mixed, are formed in the joint portion 19 between the core layer 11 and the skin layer 12. Thus, it is possible to enhance the joining force between the skin layer 12 and the core layer 11 and to reduce the possibility that the skin layer 12 and the core layer 11 will separate between the layers, even if a load is applied to the fiber-reinforced resin molding 10.

Therefore, according to the method for producing a fiber-reinforced resin molding 10 of the present embodiment, it is possible to prevent the skin layer 12 from separating from the core layer 11 by increasing the joining force between the skin layer 12 and the core layer 11.

(4) The recesses 18 are formed using a lost wax method.

Thus, it is possible to precisely form the recesses 18 on the skin layer 12.

A method for producing a fiber-reinforced resin molding 10 according to another embodiment will be described with reference to FIG. 4.

1. Application of Wax

Figure 4A:
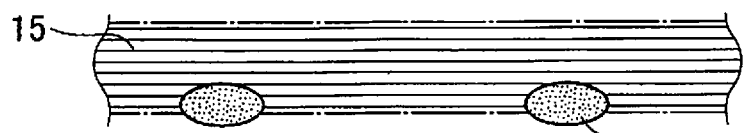
FIG. 4A is an explanatory view of a method for producing the fiber-reinforced resin molding according to another embodiment of the present invention.

First, wax 21 is applied to a sheet or a bundle of fibers 15, as illustrated in FIG. 4A, in randomly distributed fashion and the applied wax 21 is cured and hardened.

2. Injection of Matrix Resin into the Mold

Figure 4B:
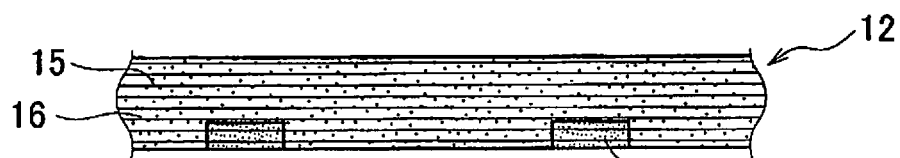
FIG. 4B is an explanatory view of a method for producing the fiber-reinforced resin molding according to another embodiment of the present invention.

Next, the fibers 15 are placed in the mold and the matrix resin 16 is injected into the mold to impregnate the fibers 15 with the matrix resin 16, as illustrated in FIG. 4B. The impregnated matrix resin 16 is then cured and hardened to prepare the skin layer 12.

3. Removal of the Wax

Figure 4C:
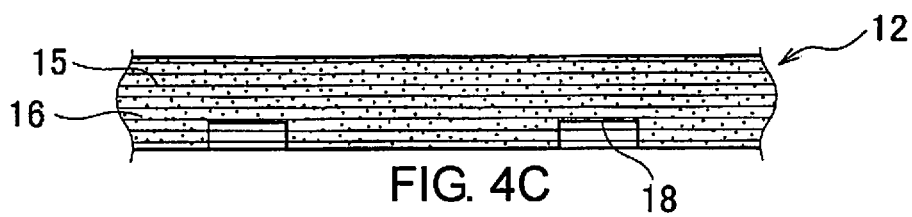
FIG. 4C is an explanatory view of a method for producing the fiber-reinforced resin molding according to another embodiment of the present invention.

Next, the wax 21 is melted with warm water or a solvent to form recesses 18 on the skin layer 12, as illustrated in FIG. 4C.

4. Stacking

Figure 4D:
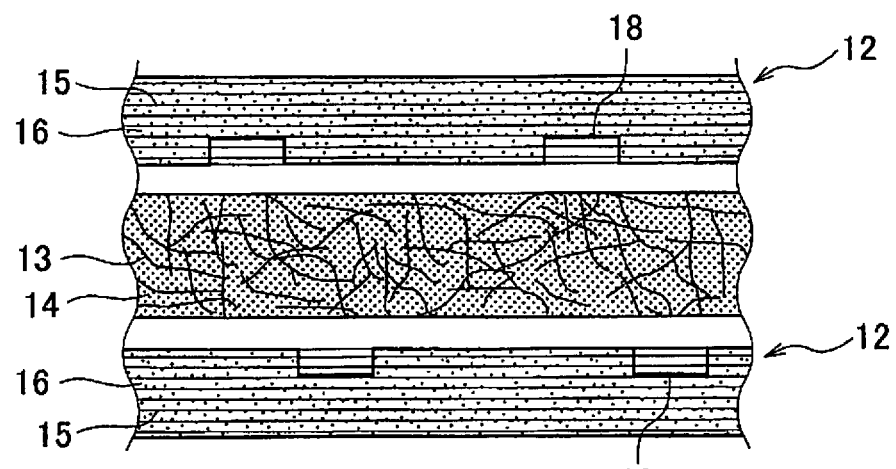
FIG. 4D is an explanatory view of a method for producing the fiber-reinforced resin molding according to another embodiment of the present invention.

Next, a nonwoven fabric-containing adhesive (nonwoven fabric 13 that has been impregnated with impregnating resin 14 in advance) is stacked between a pair of skin layers 12, 12 to prepare a stacked body 23, as illustrated in FIG. 4D.

5. Forming the Fiber-Reinforced Resin Molding

Figure 4E:
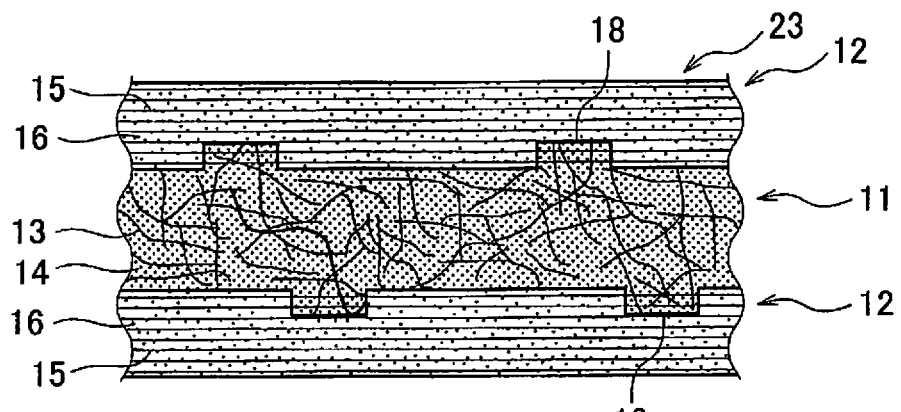
FIG. 4E is an explanatory view of a method for producing the fiber-reinforced resin molding according to another embodiment of the present invention.

Next, the stacked body 23 is placed in a mold, and a fiber-reinforced resin molding 10 is formed inside the mold, as illustrated in FIG. 4E. In this step to form the fiber-reinforced resin molding 10 in a mold, portions of the nonwoven fabric 13 and the impregnating resin 14 are made to penetrate each recess 18, and the fibers 15 that are exposed due to the removal of the wax 21 become entangled with the nonwoven fabric 13. The impregnating resin 14 is cured and hardened to prepare a fiber-reinforced resin molding 10.

In this embodiment, a hot press molding method or an autoclave molding method may be used as the method for forming the fiber-reinforced resin molding 10.

By using such a method for producing a fiber-reinforced resin molding 10, it is possible to prevent the skin layer 12 from separating from the core layer 11 by increasing the joining force between the skin layer 12 and the core layer 11.

The present invention was explained above in accordance with the embodiments, but the present invention is not limited by the foregoing descriptions, and it is obvious to a person skilled in the art that various modifications and improvements are possible.

The invention claimed is:

1. A fiber-reinforced resin molding comprising:
    a core layer comprising a nonwoven fabric and impregnating resin that has been impregnated in the nonwoven fabric; and
    a pair of skin layers comprising fibers and a matrix resin that covers the fibers, and each of the skin layers being joined to one surface of the core layer; wherein
    the skin layers have recesses formed on side surfaces facing the core layer such that portions of the fibers in the matrix resin are exposed, and
    portions of the nonwoven fabric and the impregnating resin penetrate the recesses such that the fibers exposed in the recesses formed on the skin layers are entangled with the nonwoven fabric of the core layer.

2. The fiber-reinforced resin molding as recited in claim 1, wherein
    positions of the recesses in an in-plane direction of the skin layers are asymmetrical relative to the core layer between one and the other of the skin layers.

3. A method for producing a fiber-reinforced resin molding provided with a core layer comprising a nonwoven fabric and impregnating resin that has been impregnated in the nonwoven fabric, and a pair of skin layers comprising fibers and a matrix resin that covers the fibers, and each of the skin layers being joined to one surface of the core layer, the method comprising:
    forming recesses in which portions of the fibers in the matrix resin are exposed on side surfaces of the skin layers facing the core layer; and
    disposing the nonwoven fabric between the pair of the skin layers, causing portions of the nonwoven fabric and the impregnating resin to penetrate the recesses, and joining the skin layers and the core layer in that state, the fibers exposed in the recesses that are formed on the skin layers are entangled with the nonwoven fabric of the core layer.

4. The method as recited in claim 3, wherein
    the recesses are formed by using a lost wax method.

* * * * *